United States Patent Office 3,070,574
Patented Dec. 25, 1962

3,070,574
PROCESS FOR GRAFTPOLYMERIZING ALPHA-METHYLSTYRENE IN THE PRESENCE OF CYCLIC ETHERS AND ALKALI METAL CATALYST
Ernst-Guenther Kastning and Klaus Bronstert, Ludwigshafen (Rhine), Germany, assignors to Badische Anilin- & Soda - Fabrik Aktiengesellschaft, Ludwigshafen (Rhine), Germany
No Drawing. Filed Apr. 13, 1959, Ser. No. 805,696
Claims priority, application Germany Apr. 16, 1958
3 Claims. (Cl. 260—45.5)

This invention relates to a process for the polymerization and copolymerization of alpha-methylstyrene and its derivatives substituted on the nucleus.

It is difficult to polymerize alpha-methylstyrene with radical-forming catalysts. With ionic catalysts such as aluminum chloride, boron fluoride or titanium-4-chloride, alpha-methylstyrene can be polymerized to form either liquid or solid and brittle products. This polymerization reaction, however, is markedly dependent on temperature. Solid polymers are only obtained at a polymerization temperature of about —100° C. or less. It is possible to dimerize alpha-methylstyrene with sulfuric acid or phosphoric acid at higher temperatures. It is also known that alpha-methylstyrene can be polymerized with sodium to high molecular weight products. This process, however, is quite troublesome to carry out because very long polymerization periods are required, for example 100 to 150 hours or more. Moreover, only somewhat more than 50% of the alpha-methylstyrene is polymerized by this means.

We have now found that alpha-methylstyrene or its derivatives substituted on the nucleus can be polymerized and copolymerized advantageously at temperatures between —100° C. and +60° C. with the aid of alkali metals and/or alkali metal hydrides to form high molecular weight polymers or copolymers by carrying out the polymerizations in the presence of cyclic ethers or acetals.

Besides alpha-methylstyrene itself, there may be used according to the process of this invention the derivatives thereof substituted on the nucleus provided the groups substituted on the nucleus do not react with alkali metals. Such compounds are alpha-methylstyrenes alkylated on the nucleus, as for example ortho-, meta- and para-methyl-alpha-methylstyrene, 2,4-dimethyl-alpha-methylstyrene or other dimethyl - alpha - methylstyrenes, para - isopropyl-alpha-methylstyrene or also para-vinyl-alpha-methylstyrene, para-isopropenyl-alpha-methylstyrene and the like.

The polymerization commences immediately after the components taking part in the polymerization have been brought together and then often proceeds so violently that the polymerization vessel must be cooled. It is ended in about 10 minutes to about 15 hours depending on the degree of dispersion of the alkali metal or the corresponding hydride and the temperature used, and at room temperature it proceeds to a conversion of about 70%. Below 0° C., the conversion is more than 90% and at —20° C. it is practically complete.

The alpha-methylstyrene or its nuclear-substituted derivatives are preferably used immediately after they have been distilled. If they contain impurities such as autoxidation products, the polymerization still takes place, but more catalyst is required and polymers are obtained with somewhat lower molecular weights. Sodium, potassium and also lithium are especially suitable as alkali metals. Mixtures or alloys of these metals with one another may also be used.

The hydrides of sodium or potassium are especially suitable as alkali metal hydrides, but lithium hydride may also be used. Mixtures are also suitable, as are also complexes of alkali hydrides and hydrides of groups IIA and IIIB of Mendelejeff's periodic system, as for example Na(AlH$_4$).

Tetrahydrofurane and dioxane are examples of suitable cyclic ethers in the presence of which the polymerization is to be carried out. Suitable acetals are for example acetaldehyde dimethyl acetal, acetaldehyde diethyl acetal or other acetals of aliphatic aldehydes with aliphatic alcohols, and also benzaldehyde dimethyl acetal and the like. Mixtures of cyclic ethers with the acetals may also be used. During the polymerization process, the cyclic ethers and acetals not only serve to accelerate the polymerization but they act at the same time as diluents so that the reaction mixture can be moved and stirred and a good thorough mixing of the components participating in the polymerization and also a good withdrawal of the polymerization heat can be achieved. Indifferent hydrocarbons, as for example pentane, hexane, octane, benzene, toluene and the like, may also be used as additional diluents. By continually moving the reaction medium it is possible to lead away the polymerization heat well so that constancy of temperature is ensured.

The polymerisation may also advantageously be carried out in screws or kneaders. This is especially preferable when the polymerization is carried out continuously. When polymerizing in screws or kneaders, an intimate mixing of the polymerization components takes place even when the polymerization mixture has become very viscous and tough in an advanced stage of the polymerization. A liquid medium is of advantage for working up because by pouring into an alcohol, as for example methanol, ethanol or propanol, or into water while stirring vigorously, the poly-alpha-methylstyrene is obtained directly as a white powder in the pure state. The catalyst is thereby washed out and remains in the washing liquid when the polymer is separated. The removal of the catalyst from a solid reaction medium is more difficult.

The polymer may also be worked up with water or steam or in a kneading machine in the presence of air. The end groups of the polymer occupied by sodium are thereby oxidized and polymeric alcoholates are obtained which can remain in the polymer and are effective therein as lubricants.

A special peculiarity of the process resides in the fact that after the polymerization of a given amount of alpha-methylstyrene has ended, the polymerization can be continued by the addition of fresh alpha-methylstyrene, even after a prolonged interruption of up to several days. In this way the molecular weight of the polymer originally present is increased, i.e. the newly introduced monomers polymerize onto the already formed polymers. The molecular weight of the polymers can thereby be adjusted at will. An upper limit is provided in practice by the fact that the polymerization proceeds more sluggishly with increasing dilution. For example, poly-alpha-methylstyrenes with limiting viscosities above about 3 are formed only after very long reaction periods (up to 100 hours) whereas polymers with limiting viscosities up to 2 form by a rapid reaction.

A polymerization which has already taken place can be continued not only with alpha-methylstyrene but also with other monomers, as for example with styrene or nuclear alkylated styrenes, or with dienes, as for example butadiene or isoprene, or with vinylcarbazole. The polymerization may also be continued consecutively with two or more of these monomers or also with alpha-methylstyrene.

There are thus formed copolymers in which the components of the copolymer are not distributed statistically in the polymer chain, but in which large sections of the polymer chain consist of one component. For example copolymer chains may be built up from the following components:

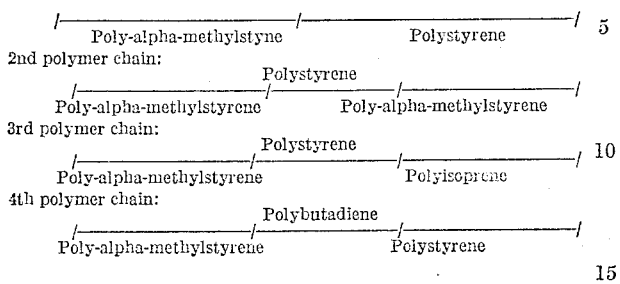

2nd polymer chain:
3rd polymer chain:
4th polymer chain:

The copolymers thus prepared are linear graft polymers in contrast to graft polymers which are prepared for example by grafting an irradiated polymer and which contain the graft components as side chains.

If, however, one or more of the copolymerization components are mixed with alpha-methylstyrene and the mixture is polymerized according to this invention, copolymers are obtained which contain the components statistically distributed in the polymer chain.

The copolymers should contain at least 20% by weight of alpha-methylstyrene or a derivative of alpha-methylstyrene.

The linear grafting of a further component onto poly-alpha-methylstyrene renders the polymer very stable thermally, for example up to about 260° C. Pure poly-alpha-methylstyrene, on the contrary, already suffers a marked depolymerization at this temperature.

Oxygen and water, and also alcohols, must be carefully excluded during the polymerization. Even small traces of these substances have a troublesome effect, especially when high molecular weights are aimed at, because each of these molecules interrupts a polymerization chain.

The homo-poly-alpha-methylstyrene obtained by this process have high mechanical resistance and stability to high temperature. They soften between 160° and 173° C. They have excellent dielectric properties and may serve for the production of electrical insulating members resistant to elevated temperatures.

Graft copolymers of poly-alpha-methylstyrene with styrene are of special technical interest because they are boil-proof and capable of being sterilized. The softening point of these graft copolymers is higher than that of the copolymers of the same composition; for example a copolymer from 22.5% of alpha-methylstyrene and 77.5% of styrene softens at 108° C., whereas a graft copolymer of the same composition does not soften until 113° C.

The following examples will further illustrate this invention but the invention is not restricted to these examples. The parts are parts by weight and all the $k$-values (according to Fikentscher, Cellulosechemie, volume 13, 58 (1932)) are measured in a 1% toluene solution.

*Example 1*

100 parts of freshly distilled alpha-methylstyrene, 50 parts of dry tetrahydrofurane and 0.5 part of sodium cuttings are stirred at 25° C. under nitrogen in a stirring vessel. After about 10 minutes, the metallic sodium dissolves and the polymerization starts with a red coloration of the reaction mixture. The heat of reaction is withdrawn by external cooling. After a total of about 30 minutes, the polymerization is ended. The very viscous reaction product is introduced into methanol with vigorous stirring and the poly-alpha-methylstyrene thereby separates as a white powder. This is washed with methanol and dried in vacuo at 100° C. 77 parts of poly-alpha-methylstyrene are obtained having a $k$-value of 46.5 and a softening point of 165° C. In the case of an identical batch but in the absence of tetrahydrofurane, no polymerization takes place even after 100 hours.

*Example 2*

150 parts of tetrahydrofurane are added a little at a time to 236 parts of alpha-methylstyrene and 1 part of sodium powder at 20° C. while stirring. After the first 10 parts of tetrahydrofurane have been added, the polymerization commences with strong evolution of heat and the polymerization vessel is cooled externally. As the reaction mixture thickens, the remaining portions of tetrahydrofurane are added so that the mixture can be stirred well up to the end of the polymerization. The polymerization is ended after 45 minutes. The reaction mixture is washed with ethanol 191 parts of poly-alpha-methylstyrene are obtained having a $k$-value of 59.2 and a softening point of 169.5° C.

*Example 3*

By working as in Example 2 but using 1.5 parts of potassium powder instead of 1 part of sodium powder, only 110 parts of tetrahydrofurane are needed to keep the reaction mixture capable of being stirred well until the end. The polymerization is ended after 4½ hours. After working up as in Example 1, 158 parts of poly-alpha-methylstyrene are obtained with a $k$-value of 42.2 and a softening point of 162° C.

*Example 4*

200 parts of alpha-methylstyrene are rolled in a rolling vessel with 5 parts of tetrahydrofurane and 0.3 part of sodium chips at 10° C. for 3 hours. During this time the sodium passes into solution and the reaction mixture becomes highly viscous. After standing for another 12 hours at 10° C. the contents of the vessel harden completely. The reaction mixture is ground with methanol to a powder which for purification is then boiled up with methanol and subsequently washed. 174 parts of poly-alpha-methylstyrene are obtained with a $k$-value of 72.3 and a softening point of 171° C.

*Example 5*

100 parts of alpha-methylstyrene are polymerized with 0.5 part of sodium chips and 50 parts of tetrahydrofurane at 25° C. as in Example 1. 5 hours after the end of the polymerization, 500 parts of alpha-methylstyrene are added. After thorough mixing, the polymerization recommences and intensive cooling with water is necessary to keep the reaction temperature at 25° C. In order to be able to stir the reaction mixture, 350 parts of tetrahydrofurane are added a little at a time. After working up as in Example 1, there are obtained 422 parts of poly-alpha-methylstyrene with a $k$-value of 62 and a softening point of 170° C.

*Example 6*

50 parts of alpha-methylstyrene are polymerized at 0° C. in the presence of 50 parts of tetrahydrofurane and 0.05 part of sodium chips. When the polymerization has commenced after about 15 minutes, a further 250 parts of alpha-methylstyrene are added a little at a time so that the reaction mixture remains capable of being stirred. After 2 hours, all the alpha-methylstyrene has been introduced and after another hour the mixture can no longer be stirred by reason of the high viscosity. After another 10 hours the reaction mixture, which has become very stiff, is ground to a white powder with methanol. 175 parts of poly-alpha-methylstyrene are obtained with a $k$-value of 78 and a softening point of 173° C.

*Example 7*

100 parts of alpha-methylstyrene are polymerized at −30° C. in the presence of 100 parts of tetrahydrofurane and 0.05 part of sodium powder. The polymerization noticeably commences about 20 minutes after the components have been brought together and ceases after about 60 minutes. After another 12 hours, the reaction mixture is worked up with methanol. 96.5 parts of poly-alpha-methylstyrene are obtained with a $k$-value of 83.5 and a softening point of 171° C.

*Example 8*

100 parts of alpha-methylstyrene are polymerized as in Example 1. After the end of the polymerization, the mixture is diluted with 200 parts of toluene and during the course of 4 hours a mixture of 300 parts of styrene and 300 parts of toluene is added while stirring and with strong external cooling. The temperature is kept at 30° C. After a further hour, half of the reaction mixture is worked up with methanol. 174 parts of a graft polymer with a softening point of 113.5° C. are obtained which consists of 22.5% of alpha-methylstyrene and 77.5% of styrene and has a $k$-value of 57.

To the other half of the reaction mixture another 50 parts of alpha-methylstyrene are added and polymerization continued at 20° C. After 10 hours, the almost solidified reaction mixture is ground with methanol to a white powder. After purification, 198 parts of polymer with a $k$-value of 61.5 remain behind.

*Example 9*

100 parts of alpha-methylstyrene are stirred with 50 parts of acetaldehyde dimethyl acetal and 0.5 part of sodium powder at 25° C. for 12 hours. The reaction mixture which has become viscous is then introduced into 500 parts of methanol with good stirring. The white powder which separates out is filtered off by suction, washed with 1% aqueous hydrochloric acid and then with water and dried. The $k$-value of the poly-alpha-methylstyrene is 48 and the softening point 164.5° C.

*Example 10*

80 parts of para-isopropyl-alpha-methylstyrene are stirred for 8 hours at 15° C. with 30 parts of tetrahydrofurane and 0.1 part of sodium powder. After working up the reaction mixture with methanol, there remain 53 parts of powdery poly-para-isopropyl-alpha-methylstyrene of the $k$-value 37.5.

*Example 11*

1,500 parts of alpha-methylstyrene and 50 parts of tetrahydrofurane are kneaded with 1 part of sodium powder at 10° C. in a kneader. The contents have become highly viscous within 45 minutes. 2 parts of butanol are then kneaded in and the catalyst thereby destroyed. Then the mixture is heated in vacuo at 190° C. for 30 minutes. The solvent and unreacted alpha-methylstyrene are thereby removed. The fused poly-alpha-methylstyrene is then removed from the kneader through a heated pipe under a pressure of 2 atmospheres. It has a $k$-value of 60.5 and a softening point of 161° C.

*Example 12*

4,000 parts of freshly distilled alpha-methylstyrene are mixed under nitrogen with 2,000 parts of tetrahydrofurane. 2 parts of finest powdered sodium are added thereto. After about 5 minutes the reaction commences with red coloration and is ended after about 60 minutes. The reaction temperature is kept at 10° C. by external cooling. While cooling and stirring, 1,000 parts of freshly distilled styrene are dripped in in the course of 3 hours. 30 minutes after the last of the styrene has been added, the reaction is ended by the addition of 100 parts of methanol. The viscous reaction mixture is then kneaded with 10,000 parts of methanol for 45 minutes in a kneader. A white powder is obtained which is washed with water until neutral. The yield is 2,410 parts. The graft polymer consists of 62% of alpha-methylstyrene and 38% of styrene. It softens at 138° C. and has a $k$-value of 77.1.

*Example 13*

500 parts of tetrahydrofurane and 3 parts of finest powdered sodium are added under nitrogen to a mixture of 200 parts of alpha-methylstyrene and 200 parts of styrene, both freshly distilled. After the reaction has commenced, a mixture of 750 parts of styrene, 750 parts of alpha-methylstyrene and 2,500 parts of tetrahydrofurane is dripped in in the course of 2 hours. After another hour dry air is led into the reaction mixture for 2 hours at the rate of 50 liters per hour. During the entire duration of the reaction, the reaction temperature is kept at 12° C. by cooling. The mixture is finally worked up with methanol as in Example 12. 1,455 parts of a copolymer of 42% of alpha-methylstyrene and 58% of styrene are obtained with a softening point of 130° C. and a $k$-value of 63.8. The dielectric constant is 1.92 and the impact strength is 14.5 kg./cm.$^2$.

*Example 14*

0.8 part of finest powdered sodium is added at —20° C. to a mixture of 100 parts of styrene and 500 parts of tetrahydrofurane while stirring well and cooling intensely. The reaction vessel is rinsed with nitrogen. The reaction commences after a few minutes and the temperature rises to 10° C. 300 parts of alpha-methylstyrene are then added at once, thoroughly well mixed and the temperature kept at 10° C. The reaction is ended after 45 minutes. Then in the course of 30 minutes, another 100 parts of styrene are added. 1 hour after the last of the styrene has been added, the reaction is ended by the addition of 20 parts of methanol. The mixture is kneaded with 1,500 parts of methanol until the polymer is present in powder form. 436 parts of a block graft polymer are obtained which contains 54% of alpha-methylstyrene and 46% of styrene and has a $k$-value of 68.4.

*Example 15*

100 parts of alpha-methylstyrene are polymerized as described in Example 1. After the polymerization is ended, 15 parts of highly purified isoprene in admixture with 100 parts of tetrahydrofurane are dripped in in the course of 30 minutes while stirring and the reaction temperature kept at 25° C. by external cooling. The mixture is then kneaded in 200 parts of ethyl alcohol to a white powder which is filtered off by suction and washed with water until neutral. 96.5 parts of a block copolymer are obtained which contains 16% of isoprene and 84% of alpha-methylstyrene. It softens at 142° C. and has an impact strength of 32 kg./cm.$^2$ and a $k$-value of 59.7.

*Example 16*

While excluding oxygen and moisture, 100 parts of pure alpha-methylstyrene and 40 parts of dry tetrahydrofurane are mixed with 5 parts of a 20% suspension of sodium hydride in paraffin oil. This reaction mixture is stirred at 25° C. After about 15 minutes, polymerization commences and the reaction mixture discolors. After another 60 minutes, the conversion amounts to about 29%. After 10 hours a conversion of 69.5% has been reached and the reaction mixture is introduced into methanol with vigorous stirring, poly-alpha-methylstyrene thereby separating as a fibrous white powder. It is washed with methanol and dried in vacuo at 100° C.

The $k$-value of the poly-alpha-methylstyrene is 68.5 and the softening point lies at 167° C.

In an identical batch, no polymerization has taken place even after 150 hours in the absence of tetrahydrofurane.

*Example 17*

500 parts of alpha-methylstyrene are stirred with 100 parts of tetrahydrofurane and 3 parts of finely powdered sodium hydride. When polymerization has commenced, 400 parts of toluene are added at the rate at which the reaction mixture thickens, so that the contents of the vessel remain capable of being stirred well. The temperature is kept at 5° C. by external cooling. After a total of 20 hours, the reaction mixture is poured into 4,000 parts of ethanol with vigorous stirring. The precipitated white fibrous powder is filtered off by suction, boiled up with ethanol once more and then dried in vacuo at 100° C. 452 parts of poly-alpha-methylstyrene are obtained with a $k$-value of 86.7 and a softening point of 172° C.

*Example 18*

50 parts of alpha-methylstyrene are stirred with 50 parts of tetrahydrofurane and 5 parts of a 20% suspension of sodium hydride in paraffin oil at −30° C. After 28 hours an orange-colored viscous reaction mixture has formed which has 200 parts of methanol added to it at −30° C. The polymer separates at first in a rubberlike form and gradually disintegrates to a white powder. After purification, 48.8 parts of poly-alpha-methylstyrene are obtained with a $k$-value of 54 and a softening point of 166.5° C.

*Example 19*

25 parts of di-isopropyl ether and 0.5 part of finely powdered sodium hydride are added to 50 parts of alpha-methylstyrene and stirred at 20° C. After 16 hours, the contents of the vessel having become so viscous that the stirring must be discontinued. After a total of 24 hours, the reaction mixture is ground to a powder with methanol. After purifications 36 part, of poly-alpha-methylstyrene are obtained with a $k$-value of 66.4 and a softening point of 168° C.

*Example 20*

500 parts of alpha-methylstyrene are polymerized as in Example 17. After about 20 hours, the polymerization is ended. While stirring at 5° to 15° C., 125 parts of styrene mixed with 125 parts of toluene are added to the reaction mixture in the course of 2 hours. After another 4 hours, the reaction product is worked up with methanol and purified. 524 parts of a linear graft polymer of 77% of alpha-methylstyrene and 23% of styrene are obtained with a $k$-value of 62 and a softening point of 133° C.

We claim:
1. A process for the production of high molecular weight linear graft copolymers of alpha-methylstyrene which comprises: polymerizing alpha-methylstyrene at a temperature between −100° C. and +60° C. in the presence of a substance selected from the group consisting of alkali metals and alkali metal hydrides and in the presence of a cyclic ether selected from the group consisting of tetrahydrofurane and dioxane; adding to the reaction mixture a polymerizable monomer selected from the group consisting of styrene, nuclear alkylated styrene, butadiene, isoprene, and vinylcarbazole; and thereafter copolymerizing said polymerizable monomer and said polymer of alpha-methylstyrene whereby a linear graft copolymer is obtained, the amount of polymerizable monomer added to said alpha-methylstyrene polymer being such that at least 20% by weight of said linear graft copolymer is made up of alpha-methylstyrene.

2. A process as in claim 1 wherein said polymerizable monomer is styrene.

3. A process as in claim 1 wherein said polymerization of alpha-methylstyrene takes place in the presence of metallic sodium and tetrahydrofurane, and wherein said polymerizable monomer is styrene.

References Cited in the file of this patent

UNITED STATES PATENTS

| | | |
|---|---|---|
| 2,621,171 | Jones | Dec. 9, 1952 |
| 2,658,058 | Werkema | Nov. 3, 1953 |
| 2,920,065 | Meyerholtz et al. | Jan. 5, 1960 |

OTHER REFERENCES

Schildknecht: "Vinyl and Related Polymers," Wiley, New York (1952), page 138.

Barron: "Modern Synthetic Rubbers," Chapman & Hall Ltd., London (1949), page 194.

McCormick: "J. Polymer Scit.," 25, 488 (1957).

UNITED STATES PATENT OFFICE
CERTIFICATE OF CORRECTION

Patent No. 3,070,574                                          December 25, 1962

Ernst-Guenther Kastning et al.

It is hereby certified that error appears in the above numbered patent requiring correction and that the said Letters Patent should read as corrected below.

Column 6, line 75, for "toleuene" read -- toluene --; column 7, line 30, for "After purifications 36 part," read -- After purification, 36 parts --; column 8, line 40, for '"J. Polymer Scit.,"' read -- "J. Polymer Sci.," --.

Signed and sealed this 29th day of October 1963.

(SEAL)
Attest:
ERNEST W. SWIDER

EDWIN L. REYNOLDS

Attesting Officer

Acting Commissioner of Patents